H. W. LEONARD.
AUTOMATIC CIRCUIT BREAKER.
APPLICATION FILED FEB. 19, 1907.

960,970.

Patented June 7, 1910.
2 SHEETS—SHEET 1.

WITNESSES

H. Ward Leonard INVENTOR

BY
Edwards, Sager & Wooster
his ATTORNEYS

H. W. LEONARD.
AUTOMATIC CIRCUIT BREAKER.
APPLICATION FILED FEB. 19, 1907.
Patented June 7, 1910.
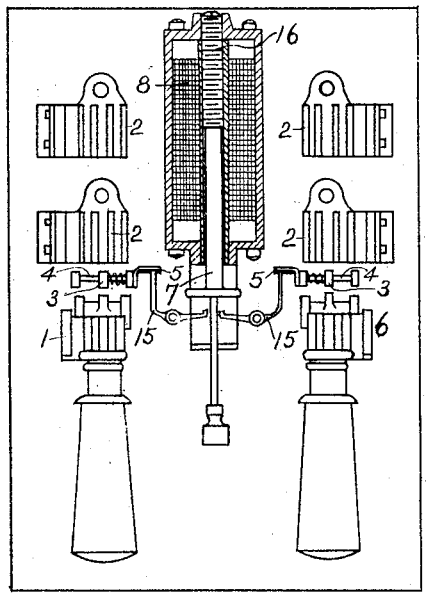
Fig. 4
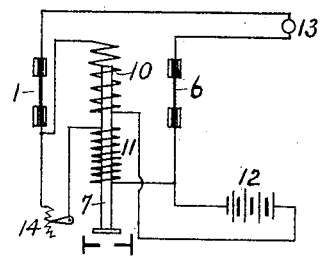
Fig. 5
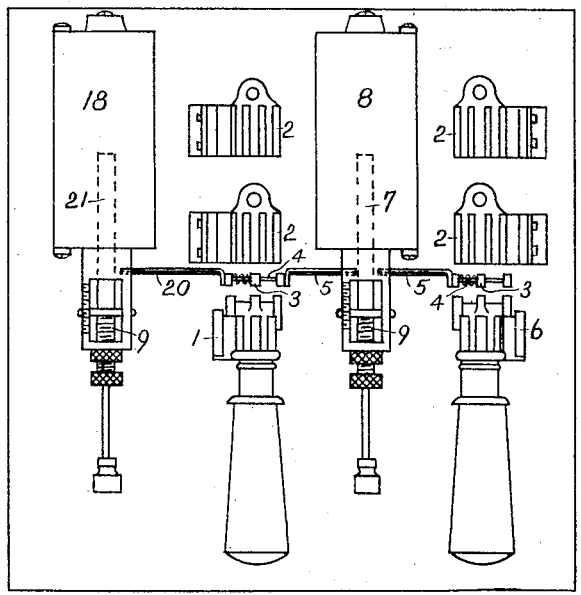
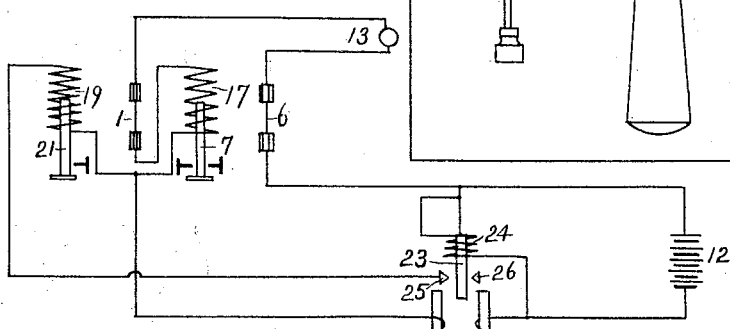
Fig. 6
Fig. 7
WITNESSES
H. Ward Leonard INVENTOR
BY Edwards, Sager & Wooster
His ATTORNEYS

UNITED STATES PATENT OFFICE.

HARRY WARD LEONARD, OF BRONXVILLE, NEW YORK.

AUTOMATIC CIRCUIT-BREAKER.

960,970. Specification of Letters Patent. Patented June 7, 1910.

Original application filed March 21, 1901, Serial No. 52,128. Divided and this application filed February 19, 1907. Serial No. 358,280.

*To all whom it may concern:*

Be it known that I, HARRY WARD LEONARD, a citizen of the United States, residing at Bronxville, in the county of Westchester and State of New York, have invented certain new and useful Improvements in Automatic Circuit-Breakers, of which the following is a full, clear, and exact specification.

This application is a division of my pending application filed March 21, 1901, Serial No. 52128, granted February 26, 1907, Patent No. 845,655.

My invention relates to improvement in circuit breakers and similar devices, and especially to circuit breakers of the type in which one or more switches or their equivalents are operated automatically whenever the circuit conditions vary beyond certain limits.

In some forms of the invention abnormal variations of amperes in the circuit affect the operation, the circuit being broken at one or more places whenever the number of amperes exceeds or falls below the desired limit. In some forms of the invention the element of voltage is the factor which determines the automatic operation, the circuit being broken when the voltage of the current exceeds or falls below predetermined limits. In other forms of the invention one element may be controlled by the volts and another by the current; for example, a device will be automatically actuated when the current exceeds a predetermined limit, and a device will also be automatically actuated whenever the volts fall below a certain predetermined limit. There are many combinations of various possible limits, both in respect to current and voltage, which are useful in connection with the control of circuits supplying various kinds of electrical translating devices. Furthermore, in some instances a reversal of current or reversal of electromotive force may determine the limit, causing the automatic action of a controlling device. The invention may of course be embodied in various other forms of apparatus.

In order that the invention may be better understood, attention is directed to the accompanying drawings forming part of this specification, and in which—

Figure 1:
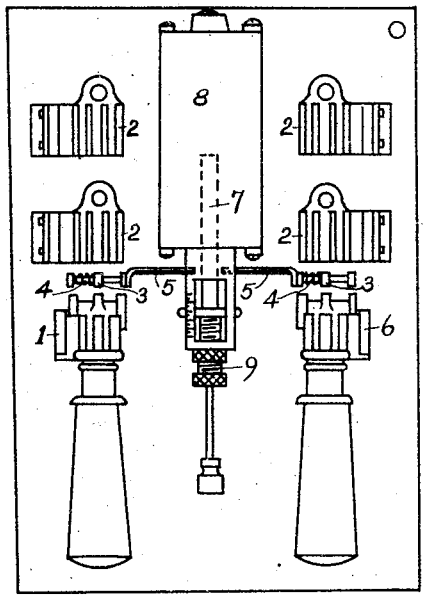
Figure 2:
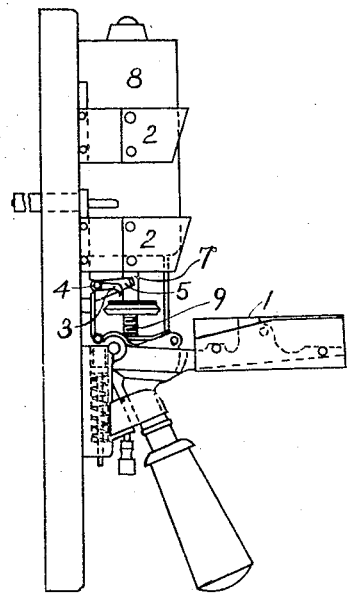
Figure 3:
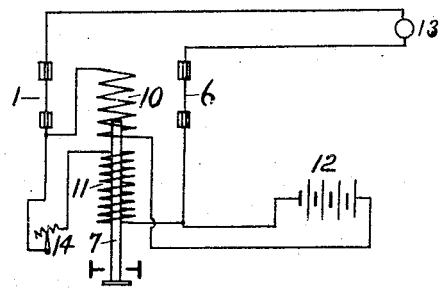

Figure 1 is a front elevation of the automatic switches of one form of my invention; Fig. 2 is a side view of the same; Fig. 3 is a diagram of connections of the form shown in Fig. 1; Fig. 4 is a front elevation and a part sectional view of the automatic switches of another form of my invention; Fig. 5 is a diagram of connections of the form shown in Fig. 4; Fig. 6 is a front elevation of the automatic switches of another form of my invention; and Fig. 7 is a diagram of the connections of the form shown in Fig. 6.

In all of the above views corresponding parts are represented by the same reference characters.

In Fig. 1 a knife-blade switch 1 is adapted to close a circuit between contacts 2, 2 and to be normally locked in its closed position by means of a latch 3, as described in patent granted to myself and Henry Price Ball for electric circuit breakers, July 22, 1902, No. 705,102. The latch 3 is mounted upon a rock-shaft 4, from which a trip arm 5 extends as shown. The rock-shaft 4 is mounted in bearings on the base plate and a spring is coiled around the shaft with one end engaging one of said bearings, and the other end engaging the back of latch 3 to throw it into the latching position. A second switch 6 is also mounted upon the base plate in a position corresponding to that of switch 1 and is adapted to similarly engage another pair of contacts 2, 2. The switch 6 is similarly provided with a retaining latch 3 mounted upon a rock-shaft 4 having a trip arm 5 extending therefrom. Coöperating with the trip arms 5 is the core 7 of a solenoid winding 8. The core 7 carries a disk as shown, which is adapted to engage the two trip arms 5 and so disengage the latches from the switches 1, 6, or from either one of them, when the core is raised. In this form the core 7 is normally down, but when the magnetization of the same increases to a predetermined amount, the core will be raised and cause the automatic opening of the switches. The closing of one switch followed by the closing of the other will result in the operation of the device to cause the opening of the switch first closed, even if the second switch be held closed by the operator and in case the condition of the circuit is such as to cause the excitation of the core 7 to equal or exceed the predetermined amount. With this form of device therefore, as described in said patent of Leonard and Ball, the circuit cannot remain closed when the condition of the circuit is such as to cause the excitation of the core to exceed a predetermined amount, even when the circuit is closed by the operator. The initial position of the core with reference to the solenoid winding is adjustable by means of adjusting screw 9, so that the amount of magnetic effect necessary to move the core can be varied as desired, and a scale will also be used indicating to the operator the desired initial adjustment of the core in order that a definite magnetic effect may be obtained to effect the elevation of the core.

The solenoid winding 8 of Figs. 1 and 2 comprises two coils 10 and 11, the connections of which will be understood from Fig. 3. This form of my invention illustrates a reverse current circuit breaker which opens one or both of the switches automatically if the current charging the storage battery 12 for example, should reverse due to the electromotive force of the source falling below that of the battery, the source being indicated at 13. The coil 10, which in the present instance is affected by the main current, is connected in series with the storage battery 12. The coil 11 which coöperates with coil 10 to control the magnetization of the core 7, is shunted across the line and is provided in series therewith, with an adjusting rheostat 14 by which the magnetic effect of the coil may be adjusted. When the current flows to the battery in the normal direction, the magnetizing effects of the two coils 10, 11 comprising the solenoid winding 8 are counter to each other so that the core 7 will not be elevated. If however, the current in the local battery circuit reverses in sense, the effect of the coil 10 will be to supplement the coil 11, elevating the plunger and causing the opening of the circuit breaker. The rheostat 14 enables one to adjust the device so that a predetermined current flow will cause the circuit to be opened. For example, when no current flows in coil 10, the coil 11 may have sufficient current to cause the circuit breaker to be opened; or the adjustment may be such that reversed current of predetermined strength is required before the circuit will be opened. It will also be understood that the initial position of the core with reference to the solenoid may be adjusted as above stated by means of the adjusting screw 9 and so vary as desired the amount of magnetic effect to move the core.

In Figs. 4 and 5, I illustrate a very similar arrangement to that shown in the preceding figures, except that normally the coils 10 and 11 act accumulatively, while upon a reversal of the current through the battery, the coil 10 will oppose the coil 11, permitting the core 7 to drop and open the circuit breakers. The core 7 in this form of construction is normally held up by the magnetizing force of the solenoid windings, and upon decrease of the magnetization to a predetermined limit, the core will be caused to fall by the action of gravity and engage the levers 15 by means of its disk, the levers in turn acting upon the extensions or trip arms 5 and so causing one or both of the switches 1, 6 to be opened. An adjustable non-magnetic screw 16 is provided at the top of the solenoid by which the position of the core or plunger can be varied with reference to the solenoid. The adjustment of the screw will vary the restraining force required to keep the core or plunger raised and thereby enable the operator to adjust the device to act upon the occurrence of predetermined conditions. When the magnetization of the core is reduced to the predetermined amount, the plunger as above stated will fall by its weight and deliver a blow to the levers 15, so tripping the latches and permitting the switches to be opened by the usual operating spring.

It will be understood that where I have shown two coils coöperating to act in a certain way, as for example, in Figs. 1 to 5, they may be variously arranged; the two coils may sometimes be arranged one above the other, or in many instances one may be superimposed upon the other and in practice the latter construction is preferable. The displacement of the coils with reference to each other as shown in Figs. 3 and 5 adds to the clearness however.

Figs. 6 and 7 illustrate a different arrangement and in which solenoid 8 comprises only a single winding 17, and which controls the action of the core 7 for causing the operation of both switches 1 and 6. An additional solenoid 18 which comprises the winding 19 is also provided and which acts to control the automatic movement of switch 1. This is accomplished by providing the rock-shaft 4 with an additional extension 20 adapted to be engaged by the disk carried by the core or plunger 21 of the solenoid 18. This core is normally down and when its magnetization exceeds the predetermined amount will rise and deliver a blow to the trip arm 20 and so cause the latch 3 to disengage the switch 1 and permit the same to be opened automatically. The coil 17 is connected in series in the main circuit and acts in the usual manner as an overload protective winding. A battery 12 is shown connected in the main circuit, and in series therewith is connected the winding of the magnet 22 of a polarized relay. The armature 23 of the relay is provided with a magnetizing coil 24 connected across the battery for magnetizing it in a definite sense as shown. The armature 23 of the polarized relay is in circuit with the coil 19, but that circuit is normally broken at the contact 25 which is controlled by said armature. Normally the armature 23 will be in contact with a back stop 26 so that the coil 19 will be deënergized. In the event of a reversal of current, however, through the battery, the magnetism of the magnet 22 will be reversed in sense and cause the armature 23 to be moved in the other direction and so close the contact 25 to energize the coil 19 which will then elevate the core 21 and open switch 1. In the event of overload, the overload coil 17 will elevate its core 7 as usual, and cause the opening of the switches.

It will be understood that the constructions indicated in the drawings are applicable to any form of apparatus where one source is in circuit with another, such for example, where two dynamos are in parallel, and where an abnormal reversed current may flow between the two sources of electromotive force.

It is very advantageous to provide two independently operative switches in a circuit as described and shown in the various figures, not only as regards greater reliability and efficiency of the apparatus, but also on account of the advantage secured which overcomes the danger of the operator keeping the circuit closed when an overload, short circuit, or other objectionable condition exists. For example, when the operator closes one switch and then the other, if any abnormal electrical condition exists the first will be opened automatically, even though the second is held closed by the operator and the possibility of maintaining the circuit closed is thus avoided.

Having thus described my invention, I declare that what I claim as new and desire to secure by Letters Patent, is,—

1. The combination of a controlling switch, a circuit, means for opening said switch upon occurrence of reverse current in said circuit, said means comprising a series coil having its coöperating magnetic mass and a shunt coil having an additional coöperating magnetic mass, a second independently movable switch protectively functionally related to said first-named switch, and means for causing said second switch to be automatically responsive to overload current.

2. The combination of two independently closable switches, each of said switches having its own respective restraining device, and means for automatically controlling the opening of each of said switches upon the occurrence of overload current upon the closure of the other of said switches and for opening at least one of said switches upon the occurrence of reverse current, said means comprising two electro-magnetic windings each having a corresponding magnetic mass.

3. The combination of two independently closable switches, means for opening each of said switches upon the occurrence of overload current, and means for automatically opening at least one of said switches upon the occurrence of reverse current, said means comprising two electro-magnetic windings each having its respective magnetic mass.

4. In an electric circuit controller, the combination of a switch for affecting the circuit, means for holding said switch in normal position, a series winding, a core held in normal position by gravity against the magnetism of said winding, a shunt winding, a core affected thereby, means for effecting the release of said holding means arranged to be controlled by the movement of either of said cores, a polarized electro-magnetic switch in the circuit of said shunt winding, and a second independently movable switch in series with the first switch and protectively functionally related thereto.

5. In an electric circuit controller, the combination of a switch for affecting the circuit, means for holding said switch in normal position, a series winding, a core held in normal position by gravity against the magnetism of said winding, a shunt winding, a core affected thereby, means for effecting the release of said holding means controlled by the movement of either of said cores, a polarized electro-magnetic switch in the circuit of said shunt winding affected by a reversal of current through the series winding, and functionally related means for opening the circuit elsewhere upon the occurrence of overload.

6. In a circuit breaker, the combination of a switch, means comprising a winding for controlling the opening of said switch, a relay actuated by reverse current for closing a circuit through said winding, and a second independently movable switch functionally related to the first switch.

7. In a circuit breaker, the combination of a switch, means comprising a winding for controlling the opening of said switch, a relay actuated by reverse current for closing a circuit through said winding, and means for protecting the circuit from overload current, said latter means comprising an automatic switch in series with and functionally related to said first-named switch and closable independently thereof.

In testimony whereof, I affix my signature in the presence of two witnesses.

HARRY WARD LEONARD.

Witnesses:
 GEO. A. HOFFMAN,
 L. K. SAGER.